May 9, 1939.  R. S. DRUMMOND  2,157,981
MACHINE FOR CUTTING GEARS
Filed July 13, 1936   5 Sheets-Sheet 1

FIG.5.A.

INVENTOR
ROBERT S. DRUMMOND
BY
ATTORNEYS

May 9, 1939.  R. S. DRUMMOND  2,157,981
MACHINE FOR CUTTING GEARS
Filed July 13, 1936  5 Sheets-Sheet 2
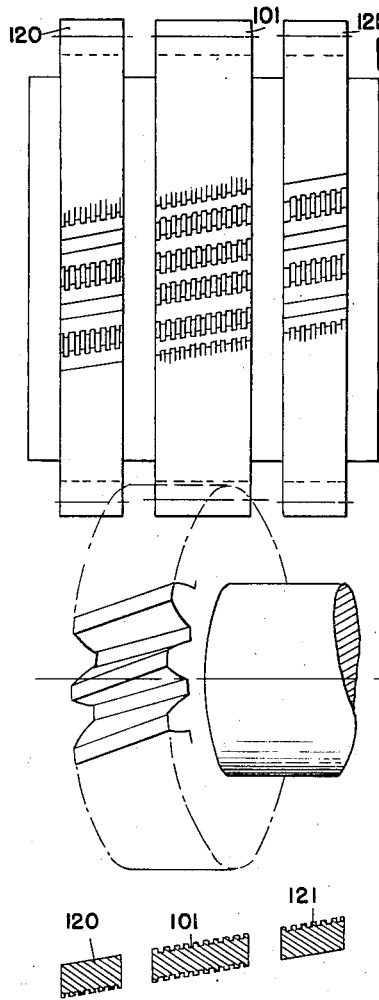
FIG.13.
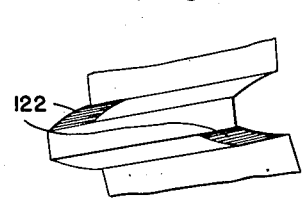
FIG.14.
FIG.15.
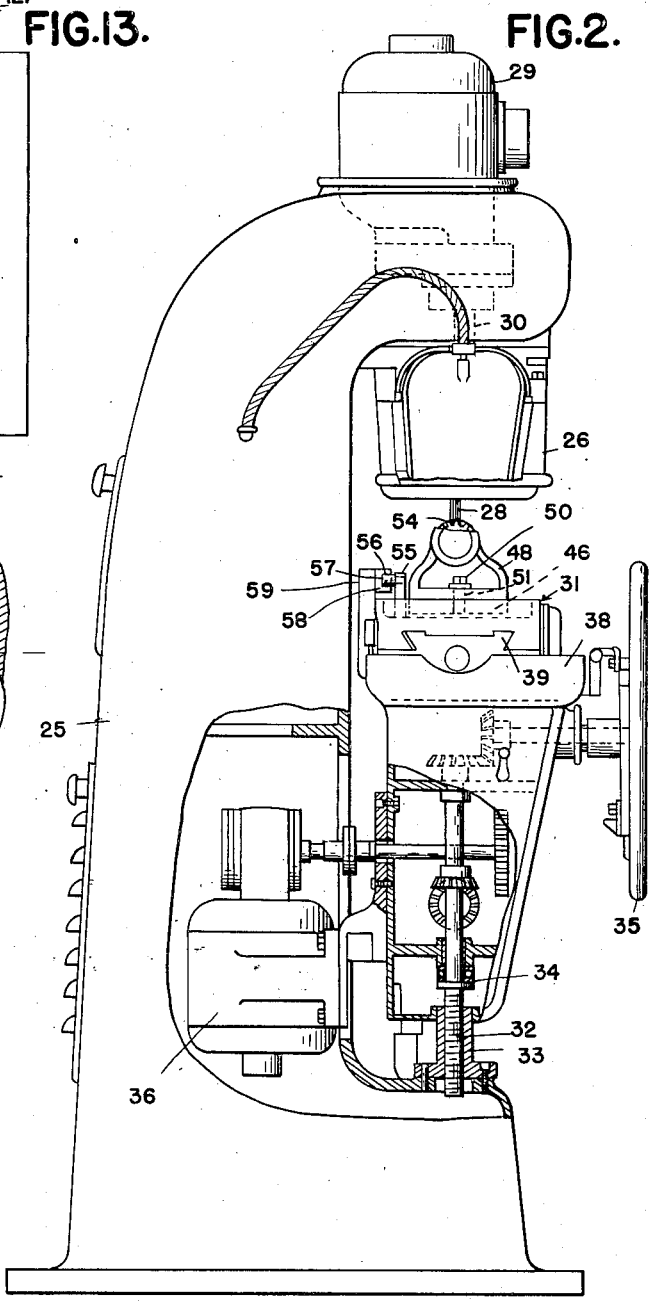
FIG.2.
INVENTOR
ROBERT S. DRUMMOND
BY Whittemore Hulbert & Belknap
ATTORNEYS May 9, 1939.    R. S. DRUMMOND    2,157,981
MACHINE FOR CUTTING GEARS
Filed July 13, 1936    5 Sheets-Sheet 3

FIG.3.A.

INVENTOR
ROBERT S. DRUMMOND
BY Whittemore Hulbert & Belknap
ATTORNEYS

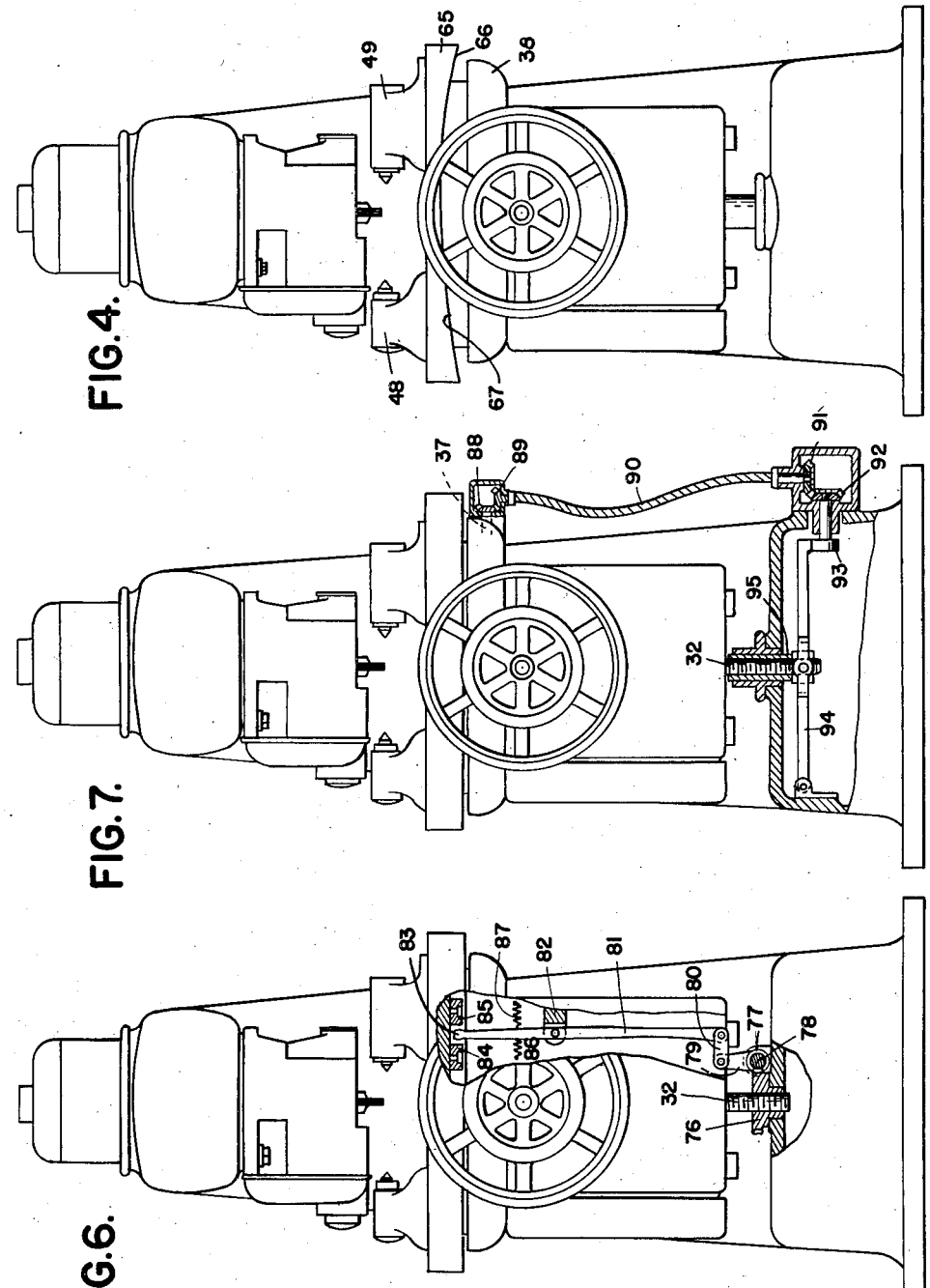

May 9, 1939.　　　　R. S. DRUMMOND　　　　2,157,981
MACHINE FOR CUTTING GEARS
Filed July 13, 1936　　　5 Sheets-Sheet 5
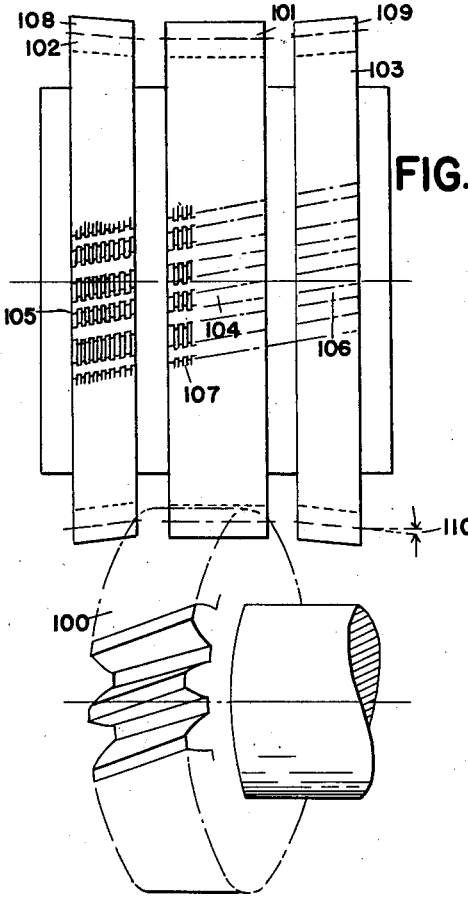
FIG.8.
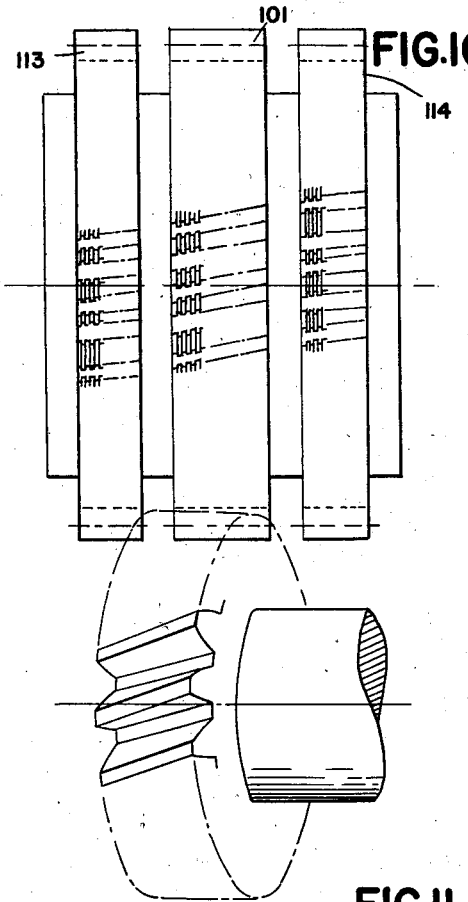
FIG.10.
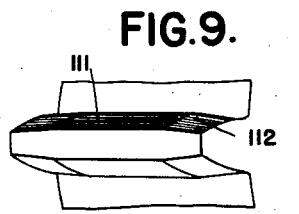
FIG.9.
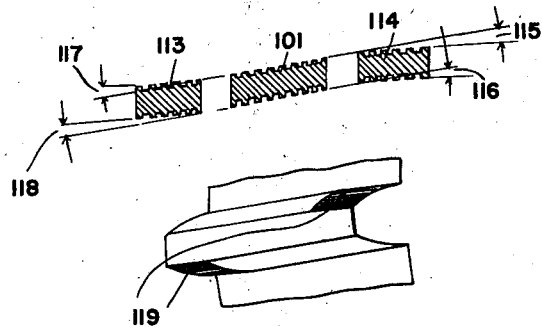
FIG.11.
FIG.12.
INVENTOR
ROBERT S. DRUMMOND
BY Whittemore Hulbert + Belknap
ATTORNEYS Patented May 9, 1939

2,157,981

UNITED STATES PATENT OFFICE 2,157,981

MACHINE FOR CUTTING GEARS

Robert S. Drummond, Detroit, Mich.

Application July 13, 1936, Serial No. 90,401

19 Claims. (Cl. 90—2)

The invention relates to the finishing of gears to obtain a high degree of accuracy, and more particularly to the formation of certain modified forms of gear teeth.

One of the principal objects of the invention is to provide methods for finish cutting gears in such a way as to provide crowning effects, that is, to relieve or round the ends of the teeth to a sufficient extent as to provide quieter and smoother running gears under practical conditions.

Another of the objects is to provide various constructions of machines for carrying out the above mentioned methods for crowning of gears.

A further object of the invention is to obtain accurately finished gears in which the teeth have novel characteristics differing from those heretofore known in the art.

Other objects will become apparent from the description of the invention hereinafter fully described and illustrated in the drawings.

In my prior patents and pending applications I have shown many ways in which gears may be accurately finished by lapping, burnishing, cutting, etc. In some of the broader aspects of this invention, my improved methods of crowning gears are applicable to any of the above mentioned types of finishing action whether they are obtained by the action of a rotary gear finisher running in mesh with a work gear under a crossed axes relation or whether they are obtained by other gear finishing actions.

More particularly, however, this invention in its preferred form relates to the crowning of gears by means of rotary gear cutting tools in which the sides of the gear teeth are provided with a series of gashes or serrations extending from the top to the bottom of the teeth providing a series of cutting edges which, when the tool is run in pressure contact with the work gear, causes an unusual type of cutting action. Such a rotary cutting tool is described in my application, Serial No. 52,566, filed December 3, 1935. One of the principal objects of the present invention is to provide methods and machines for effecting a crowning action on gear teeth with such a rotary cutting tool or with modified forms of such tools. To this end I have developed the various constructions hereinafter set forth and illustrated in the drawings, wherein Figure 1 is a front elevation partly in section of a machine embodying one form of the invention;

Figure 2 is a side elevation also partly in section;

Figure 3A is a perspective view of a portion of the machine illustrating the oscillating platform;

Figure 4 is a fragmentary front elevation partly in section of a modified machine;

Figure 5A is a section on the line 5A—5A of Figure 5;

Figure 6 is a further modified mechanism;

Figure 7 is another modified mechanism;

Figure 8 is a diagrammatic view showing a method of crowning a work gear by means of a modified form of rotary gear cutting tool;

Figure 9 is a diagrammatic view showing, on an exaggerated scale, a crowned gear tooth obtained by the method of Figure 8;

Figure 10 is a view similar to Figure 8 showing another modified form of rotary gear cutter;

Figure 11 is a top view of one gear tooth of the cutter of Figure 10;

Figure 12 is a diagrammatic view of a gear tooth obtained by the method of Figure 10;

Figure 13 is a view similar to Figure 8 showing a modified form of rotary gear cutter;

Figure 14 is a top view of one gear tooth of the cutter of Figure 13;

Figure 15 is a diagrammatic view of a gear tooth cut by the method of Figure 13;

Figure 1:
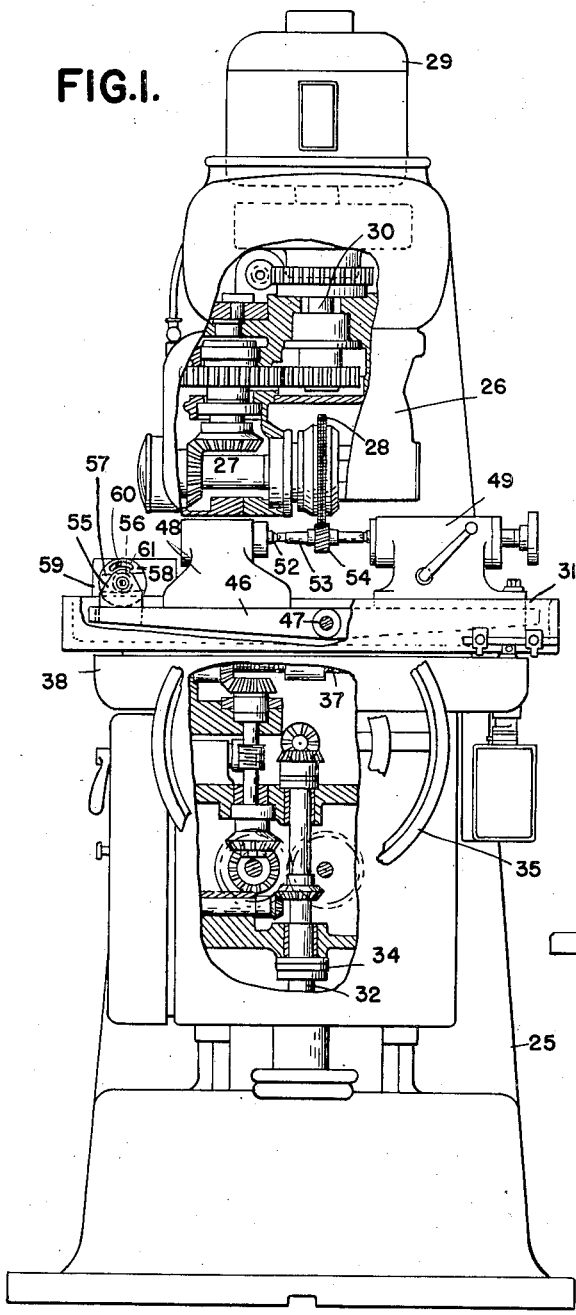
Figure 3:
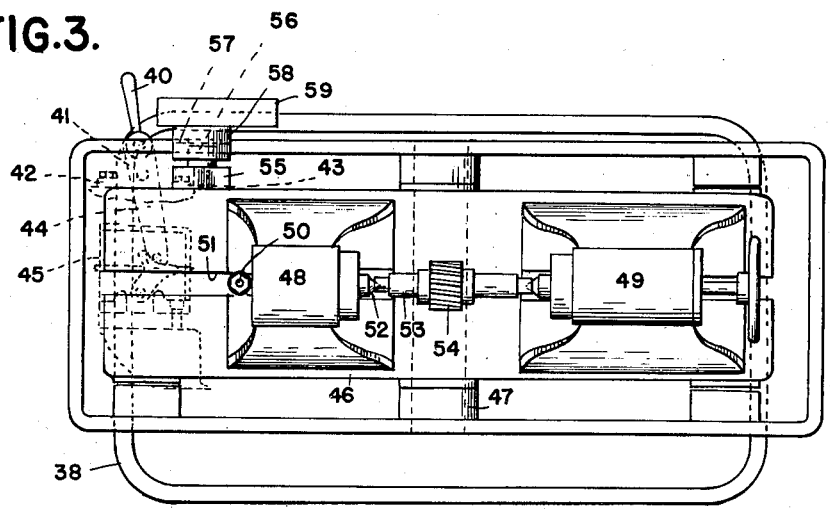
Figure 3 is a top plan view of the work table with certain portions broken away.

Referring now to Figures 1 to 3 of the drawings, I have illustrated one form of rotary gear finishing machine adapted for the crowning of gears in accordance with my invention. In the upper end of the frame 25 of this machine there is mounted a swivel head 26 adapted to be adjusted about a vertical axis. Journaled in the head is a horizontal shaft 27 on which the rotary gear cutter 28 is mounted. The cutter is rotated by means of an electric motor 29 mounted on the frame above the head and having its drive shaft 30 extending within the swivel head and connected to the cutter by a train of gearing of any suitable type. For a more specific description of the details of the mechanism, reference may be had to my co-pending application, Serial No. 3,662, filed January 26, 1935.

Beneath the head 26 is the work table 38 which is vertically adjustable by means of a vertical feed screw 32. The screw threadedly engages a nut 33 on the frame of the machine and vertically adjusts the table through the thrust bearing 34. A handwheel 35 is connected to the vertical feed screw by suitable gearing for manually elevating the work table.

The work table has secured to the lower end thereof an electric motor 36, which through suitable gearing is connected to a horizontal feed screw 37 for reciprocating the carriage 31 mounted on ways 39. Thus by energizing the electric motor, the carriage 31 is moved laterally in one direction, and by reversing the electric motor, it is driven in the opposite direction. The reversing mechanism comprises a lever 40 pivoted on the work table, having a lug 41 intermediate two adjustable stops 42 and 43 on the carriage 31. The lever 40 has a second lever arm 44 connected thereto and extending within a box 45 containing a reversing electric switch which may be of conventional construction. Thus the carriage 31 is reciprocated between the desired limits determined by the setting of the adjustable stops 42 and 43.

The mechanism previously described is all similar to that described in my co-pending application, Serial No. 3,662 above referred to. The means for providing the crowning action will now be described. The reciprocable carriage 31 has a work platform 46 mounted therein by means of a trunnion 47 substantially midway between the ends of the carriage and the ends of the platform. The platform has adjustably mounted thereon the headstock 48 and tailstock 49. These are secured in place by suitable clamping bolts 50 which engage the platform by reason of the T-slot 51 extending longitudinally of the platform. The head and tailstocks are provided with centers 52 between which an arbor 53 containing the work gear 54 is mounted. The platform 46 has at one end thereof a plate 55 with a horizontally projecting guide roller 56. This roller engages a slot 57 in the adjustable guide block 58 which in turn is carried by the plate 59 on the work table 38. The guide block 58 is rotatably adjustable with respect to the plate 59 in order to vary the angle of inclination of the slot 57 with respect to the plane of reciprocation of the carriage 31. Suitable graduations are preferably marked on the guide block to indicate the angle of adjustment thereof. In its adjusted position, the block is secured to the plate by the clamping bolts 60 which pass through the segmental slots 61 of the guide block.

With the construction as above described, it will be evident that when the guide block is adjusted to give a predetermined angular relation between the guide slot 57 and the plane of reciprocation, the platform 46 is caused to oscillate about its trunnion during the reciprocable movement of the carriage. Assuming that the gear cutter 28 is in mesh with the work gear 54 and that the two are rotating together in pressure contact with the axis of the work crossed with respect to the axis of the cutter, it will be evident that as the work gear is fed in the direction of its axis there is imparted to this axis a slight tilting movement in a vertical plane as the ends of the work gear teeth come into operative cutting relation with the gear cutter. This has the effect of rounding the ends of the work gear teeth, or, in other words, to crown the teeth. If the adjustable block 58 is set so that the slot 57 is parallel to the reciprocable movement of the carriage, there is no crowning effect. It will be apparent therefore that by suitably adjusting the angularity of the guide block, the desired degree of crowning action may be obtained for any particular work gear.

The machine as illustrated in Figures 1 to 3 is also provided with automatic mechanism for adjusting the table vertically at the end of each reciprocation of the carriage until the desired amount of metal has been removed, but as the mechanism for performing this function is fully described in application, Serial 3,662, it will not be repeated in the present application.

In the operation of the machine as thus far described, a rotary gear finishing tool 28 is selected having a helix angle such that when in proper mesh with the work gear 54, the axes of the cutter and the work gear are crossed at an angle from 3° to 30°. The setting of the axes is obtained by swiveling the head 26 to the proper angle. The guide block 58 is angularly adjusted to obtain the desired amount of crowning action. The work table 38 is adjusted by the handwheel 35 to bring the work gear into predetermined pressure contact with the rotary cutter. The adjustable stops 42 and 43 are set to give the desired amount of reciprocative movement to the carriage such that the work gear will travel for a distance not substantially less than the face width of the work gear. The machine is then set in operation by energizing the motors 29 and 36, thus rotating the cutter 28 which in turn drives the work gear 54 through the intermeshing action of the teeth. The cutting edges of the cutter are thus caused to machine the sides of the work gear teeth, and due to the reciprocation of the carriage, the cutting action is spread from one end of the work gear tooth to the other.

As the carriage 31 moves in one direction, the roller 56 riding in the groove 57 is moved at an angle to the plane of reciprocation of the carriage, thereby causing the platform 46 to swing on two trunnions and tilt the work gear arbor 53 in a vertical plane, thereby causing the cutting edges to remove a greater amount of material at one end of the work gear teeth than at the middle. At the end of the stroke in one direction the rotation of the cutter is reversed and in the backward feeding movement of the carriage, the roller swings the work arbor in the opposite direction, thus crowning the opposite ends of the work gear teeth. At the end of each reciprocation, or at predetermined intervals, the work table 31 is elevated slightly in order to feed the cutter into the work. This may be done manually by means of the handwheel 35 or by an automatic mechanism as hereinbefore referred to. When the upward feeding of the work table has progressed to the point where the desired amount of metal is removed from the work gear, it is usual to permit the machine to oscillate without further upward feeding for a few reciprocations to completely finish the tooth surfaces of the gear.

Figure 16:
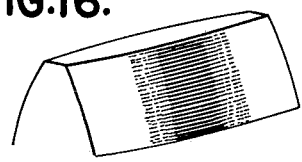
Figure 16 illustrates a spur gear tooth obtained on the machine shown in Figures 1 to 3.

If a standard type of rotary gear cutter as described in my application, Serial No. 52,565, filed December 2, 1935, is used having a tooth profile such as to generate a true involute curved on the mating work gear, the crowning action of mymachine will result in a tooth form as illustrated in Figure 16. It should be observed that Figure 16 shows the crowning effect on an exaggerated scale for the purpose of illustration. Figure 16 shows the transverse curvature of the gear tooth as substantially involute in form, while in the longitudinal direction of the tooth the profile is a convex curve.

Figure 17:
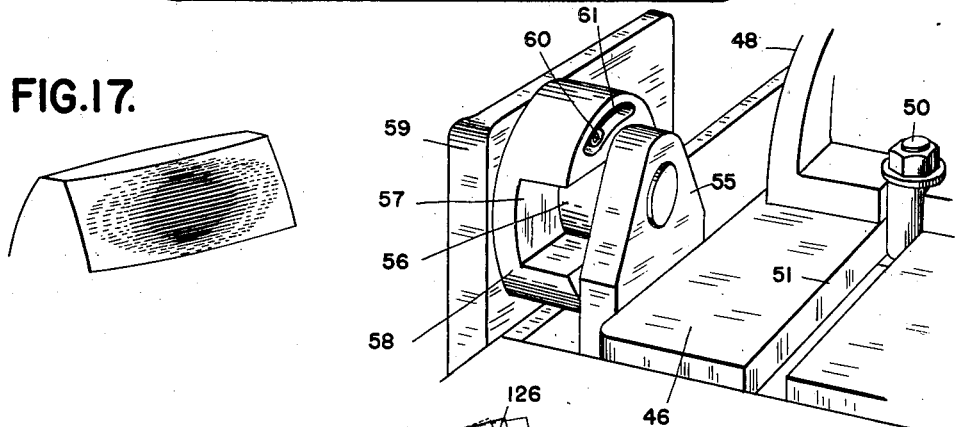
Figure 17 is a modified form of spur gear tooth which may be obtained on the machine of Figures 1 to 3.
Figure 18:
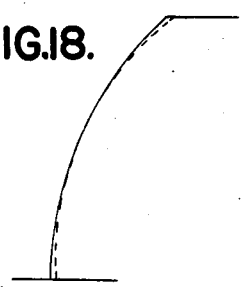
Figure 18 is a diagram showing the profile of the gear teeth of a rotary gear cutter which is used on the machine of Figures 1 to 3 to obtain the work gear tooth characteristics illustrated in Figure 17.

Another important feature of my invention is that it enables me to construct gear teeth having novel characteristics. Thus if instead of utilizing the standard type of rotary gear cutter as above mentioned, I employ a rotary gear cutter where the profile of the teeth is modified and at the same time I utilize the crowning action of the machine hereinbefore described, I may obtain a gear tooth which is curved both longitudinally and transversely to such a degree as to have the main bearing surface only in the central portion of the tooth. This is illustrated in Figure 17 wherein the shading indicates the area of maximum bearing on a spur tooth. To obtain the gear tooth form shown in Figure 17, I preferably use a rotary gear cutter having its profile modified from true involute form, represented by the dotted line Figure 18, to have excess stock at the tip and the root. The solid line in Figure 18 shows the modified curvature of the cutter. When this cutter is used for finishing a work gear, relief is provided at the tip and the root of the work gear teeth as illustrated in Figure 17.

There are other modified methods of crowning gears which come within the purview of my invention. Figure 4 illustrates one modification. As shown in this figure, the machine generally is the same as that previously described, but the reciprocable carriage 65 is no longer provided with the oscillating platform previously described, but has the headstock 48 and tailstock 49 adjustably mounted directly on the carriage. The carriage 65, however, does not reciprocate in a plane but is provided with a concavely curved bearing surface 66 cooperating with the convexly curved guiding surface 67 on the table 38. The same crowning effect is obtained by this construction when the camber of the curved surfaces 66 and 67 is predetermined to give the desired crowning effect.

Figure 5:
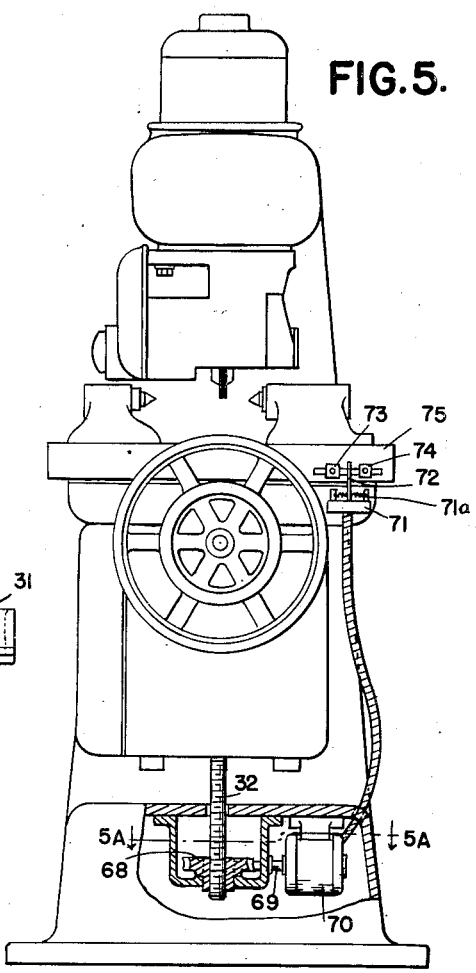
Figure 5 is a similar view showing another modified machine.

Another method of crowning gears is to adjust the distance between the axes of the cutter and the work during the reciprocating movement of the work. If the axes are brought closer together as the cutter is operating on the ends of the work gear teeth, more metal will be removed at the ends with the consequent formation of a crowning effect. As shown in Figure 5, the machine is similar to that described in Figures 1 to 3 with the elimination of the oscillating platform. The elevating feed screw 32 previously described has a worm wheel 68 secured thereto which is driven by a cooperating worm on the shaft 69 of an electric motor 70. The motor is started by a suitable electric starting switch 71 controlled by a lever 72 intermediate the adjustable stops 73 and 74 on the carriage 75. The lever is normally held in a neutral position by the springs 71a, but when moved in either direction by said stops the switch is actuated to energize the motor 70. Thus, as the carriage approaches the end of its stroke, there is an upward feed movement of the work table causing the work to move into the cutter. At the end of the stroke, the reversing mechanism for the main driving motor 36 also reverses the motor 70 so that on the return stroke the table is fed downwardly to its normal position. A stopping switch 72a has an arm 73a in the path of an adjustable stop 74a on the worm wheel 68. The stop is set to actuate the arm 73a when the gear has returned to normal position, thereby both deenergizing the motor and adjusting the electrical connections so that upon subsequent energization it will move in the original direction. When the carriage approaches the opposite end of its stroke, the same cycle takes place.

The same raising and lowering of the work table with respect to the cutter at the ends of the feeding stroke may be obtained mechanically instead of electrically. Thus as shown in Figure 6, the worm 76 on the elevating screw 32 runs with a worm wheel 77 on shaft 78. The shaft is connected by a lever 79 and link 80 to the lower end of an operating lever 81 pivoted to the frame by the bracket 82. The upper end 83 of the lever is intermediate the adjustable stops 84 and 85. Suitable mechanism diagrammatically illustrated as the oppositely acting springs 86 and 87 serve to normally keep the lever in a neutral position and to return the same to the neutral position except when prevented by the action of the stops. At one end of the reciprocating movement of the carriage, the stop 84 contacts the end 83 of the lever and through the leverage mechanism rotates the feed screw a predetermined amount. In the return movement the springs lower the feed screw and maintain a constant distance between the work and the cutter until at the opposite end of the stroke the other stop 85 similarly operates the feed screw to raise the table.

In Figure 7 another modified mechanism is shown. In this case the feed screw 37 for reciprocating the table is connected by bevel gears 88 and 89 to a flexible shaft 90 which through the bevel gears 91 and 92 operates a rotatable cam 93. The cam bears on a lever 94, supports a sleeve 95 which raises the entire table mechanism. The cam 93 has a contour such as to maintain the normal elevation of the table mechanism in the middle of the reciprocating stroke and has raised portions which come into play only at the ends of the stroke, or at such portions of the stroke as will provide the amount of crowning action desired.

My invention also contemplates the crowning of gears by means of the construction of the rotary gear cutting tool itself without requiring any special adjustments of the gear finishing machine. In other words, by rotating a cutting tool in mesh with the work gear and simultaneously reciprocating in the direction of the axis of the work gear while maintaining a fixed distance between the axes of the tool and the work, the crowning effect may still be obtained by providing modified forms of gear finishing tools. As shown in Figure 8, the work gear 100 is rotated in mesh with a compound rotary gear cutting tool comprising a center tool 101 of my standard construction shown in application, Serial No. 52,566 above referred to and two auxiliary cutting tools 102 and 103 at each side thereof. In this case the helical angle of the gear teeth 104 of the central cutter is the same as the helical angle of the gear teeth 105 and 106 in the outside cutters. Each of the gear teeth is provided with a series of serrations 107 extending from the top to the bottom of the teeth to provide cutting edges. The outside gear cutters 102 and 103 are beveled to have an increased outside diameter at the faces 108 and 109 furthest removed from the central cutter 101. The amount of the bevel is indicated by the numeral 110 and this is predetermined to give the desired crowning effect to the work gear teeth. As shown in this figure, the space between the central cutter and the outside cutters is such as to permit the outside cutters to contact with the work gear before the end of the normal reciprocating stroke for finishing the gear with the central cutter. The spacing of the cutters depends upon the amount of relief or crowning action desired.

Figure 9 shows on an exaggerated scale the appearance of a crowned gear tooth obtained by the action of the cutter shown in Figure 8. The central portion 111 of the gear tooth is of normal form, but the ends 112 are relieved or crowned in a longitudinal direction of the gear tooth.

Figure 10 shows a similar arrangement of cutters as illustrated in Figure 8, but in this case the outside cutters 113 and 114 have a different helical angle than the central gear 101. As shown in Figure 11, the difference in the helical angles is illustrated by the numerals 115, 116, 117 and 118. A gear tooth cut by the method of Figure 10 is illustrated in Figure 12, and it will be observed that the crowned portions 119 are on both sides of the teeth but on each tooth side the crowning is at one end only and the two crowned portions are at diagonally opposite positions on the gear tooth.

Figure 13 illustrates a further modified cutter in which the outside cutting tools 120 and 121 are of uniform diameter the same as the central cutter 101. As shown in Figure 14, the outside cutters may be provided with cutting teeth on one side only of the gear teeth, the opposite side of the gear teeth then serving merely as a guide. However, cutting teeth may also be formed in the guiding surfaces if so desired. It is necessary, however, to vary the helix angles on the outside cutters 120 and 121 both for guiding purposes and for cutting purposes because they are so far removed from the center of the crossed axes. A gear tooth formed by the cutting tool of Figure 13 is illustrated in Figure 15 where the numeral 122 represents the chamfered or crowned ends of the tooth.

Figure 19:
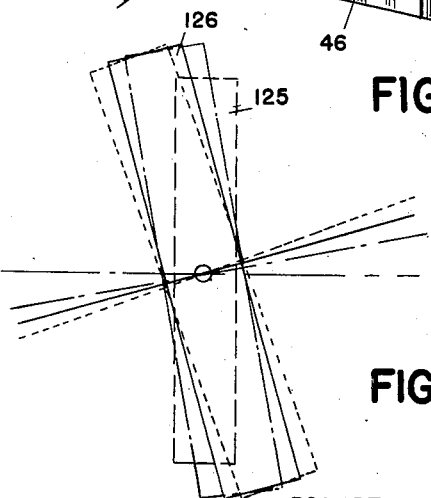
Figure 19 is a diagrammatic view illustrating a modified method of obtaining a crowning effect.

Another method for obtaining a crowning effect on gears is illustrated in Figure 19. In this method the head of the machine is swiveled during the reciprocation of the table to vary the angle of crossed axes between the cutter and the work. Thus, as shown, 125 is the gear and 126 the cutter, the latter being shown by dotted lines in several angular positions. The effect of this angular change is to chamfer or crown the ends of the teeth of the gear.

From the previous description it will be readily observed that my invention contemplates the crowning of gears by various different specific methods, all of which, however, have certain common characteristics. Thus in every case the work gear is rotated in mesh with a rotary gear cutting tool having cutting edges formed in the sides of the gear teeth, and in every case the gear and tool are in pressure contact and a feeding movement is provided in the direction of the axis of the gear. The crowning effect is in general obtained by increasing the pressure contact at the ends of the gear teeth, and as previously shown, this increased pressure may be obtained by the tilting of the work gear arbor, by the adjustment of the distance between the axes of the tool and gear, or by modifying the form of the rotary cutting tool itself. I have further shown new machine constructions for practicing the methods herein above pointed out, and I regard all of these improvements as being parts of my invention which I wish to claim in this or in co-pending applications.

It is desired to point out that by means of the various modified forms of the invention as heretofore set forth, it is possible to obtain more nearly a chamfered condition and it should be understood that in some aspects of the invention it is not to be limited to methods producing a gear having a true rounded and blended curve.

It should also be noted that where the invention has been carried out by the raising of the table or the moving of the work gear on the table, an exactly similar motion in the head of the machine is equivalent and will have the same result. Therefore, the invention is to be construed as covering this modification.

Where in the preceding description reference has been made to changing the profile of the gear teeth, it should be remembered that this can be done on one end only of the gear tooth face, leaving the balance of the tooth as a true curve or it can be made on both ends of the teeth.

It is also desired to point out that in my method of crowning gears, the crossed axes setting for various types of gears is more limited than the range for general shaving of similar parts when no crowning effect is desired. This is partly due to the fact that with large crossed axes setting there is a considerable sweep of the tool across the face of the gear, thereby largely eliminating the crowning effect. As a guide to the proper crossed axes setting, the following table gives the normal range and the most desirable angular relationship between the cutter and gears of different helical angle:

| Helical angle of gear | Normal crossed axes setting for crowning | Most desirable angle |
| --- | --- | --- |
|  | Degrees | Degrees |
| Spur | 7 to 25 | 15 |
| 10° | 6 to 25 | 13 |
| 20° | 5 to 20 | 11 |
| 30° | 4 to 20 | 9 |
| 40° | 3 to 15 | 7 |
| 45° | 3 to 15 | 5 |

For spur gears the normal range of crossed axes setting for crowning gears is 7° to 25° and the most desirable position is 15°. On gears of 20° helical angle, the desirable range of crossed axes is from 5° to 20° and the most desirable position is 11°. For high angle gears such as 45°, the range for crossed axes crowning is from 3° to 15° and the most desirable position is approximately 5°.

It should also be noted that in view of the preceding description, it will be obvious that my invention can be practiced in other modified forms and I do not wish to be restricted to only those forms which are specifically referred to in this description.

What I claim as my invention is:

1. A machine for finishing gears comprising a frame, a work gear arbor, a rotary cutting tool arbor, the axes of said arbors being crossed, a movable carriage on said frame for supporting one of said members and means responsive to motion of said carriage for automatically variably inclining the axes of one of said arbors with respect to the other in timed relation to the movement of said carriage.

2. A machine for finishing gears, comprising a frame, a spindle on said frame, means for mounting a gear shaped member on said spindle, a movable carriage on said frame, means for translating said carriage in a plane parallel to the axis of said spindle, a platform pivotally mounted on said carriage, means for supporting a second gear shaped member on said platform in mesh with said first member, means for rotating said members, and means responsive to said translation for automatically pivoting said platform in timed relation to said translation.

3. A machine for finishing gears, comprising a frame, a spindle on said frame, means for mounting a gear shaped member on said spindle, a movable carriage on said frame, means for translating said carriage in a plane parallel to the axis of said spindle, a platform pivotally mounted on said carriage, means for supporting a second gear shaped member on said platform in mesh with said first member, means for rotating said members, and means at least partly carried by said platform for automatically pivoting said platform in timed relation to said translation, said last named means comprising cooperating guiding portions on said platform and a part of said machine fixed relative to said translation.

4. A machine for finishing gears, comprising a frame, a spindle on said frame, means for mounting a gear shaped member on said spindle, a movable carriage on said frame, means for translating said carriage in a plane parallel to the axis of said spindle, a platform pivotally mounted on said carriage, means for supporting a second gear shaped member on said platform in mesh with said first member with their axes crossed at an angle less than 30°, means for rotating said members, and means at least partly carried by said platform for automatically pivoting said platform in timed relation to said translation, the pivot point of said platform lying in the plane normal to the axis of said second gear shaped member and passing centrally therethrough.

5. A machine for finishing gears, comprising a frame, a spindle on said frame, means for mounting a gear shaped member on said spindle, a movable carriage on said frame, means for translating said carriage in a plane parallel to the axis of said spindle, a platform pivotally mounted on said carriage, means for supporting a second gear shaped member on said platform in mesh with said first member with their axes crossed at an angle less than 30°, means for rotating said members, and means for automatically pivoting said platform in timed relation to said translation, said last named means comprising cooperating guiding portions on said platform and part of said machine fixed relative to said translation.

6. A machine for finishing gears comprising means for supporting two gear shaped members in mesh with their axes crossed at an angle of less than 30°, means for rotating said members, means for translating one of said members in a plane which is parallel to the axis of said other member, and means responsive to said translation for automatically gradually varying the inclination of the axes in timed relationship to said translation.

7. A machine for finishing gears comprising means for supporting two gear shaped members in mesh with their axes crossed at an angle of less than 30°, means for rotating said members, means for translating one of said members in a plane which is parallel to the axis of said other member, and means responsive to said translation for automatically gradually varying the inclination of the axes in timed relationship to said translation, said inclination varying from a minimum when said gear shaped members are in contact centrally from end to end of the teeth of the gear member being finished, and a maximum when the contact has shifted adjacent to one end of said teeth.

8. In a gear finishing machine, a platform, said platform being mounted for translation and being pivotally mounted, means for translating said platform, automatic means for pivoting said platform in timed relation to said translation comprising cooperating pin and slot elements, one of said elements being carried by said platform, and the other being carried by a part of the machine which is stationary relative to the translation.

9. In a gear finishing machine, a platform, said platform being mounted for translation and being pivotally mounted, means for translating said platform, automatic means for pivoting said platform in timed relation to said translation comprising cooperating pin and slot elements, one of said elements being carried by said platform, and the other being carried by a part of the machine which is stationary relative to the translation, and means for adjusting said slot as to inclination relative to the direction of translation.

10. In a gear finishing machine, a platform, said platform being mounted for translation and being pivotally mounted, means for translating said platform, automatic means for pivoting said platform in timed relation to said translation comprising cooperating pin and slot elements, one of said elements being carried by said platform, and the other being carried by a part of the machine which is stationary relative to the translation, said slot being formed in an element which is pivotally mounted, and means for securing said last named element in adjusted position.

11. A machine for finishing gears, comprising a frame, a spindle on said frame, means for mounting a gear shaped member on said spindle, a movable carriage on said frame, means for translating said carriage in a plane parallel to the axis of said spindle, a platform pivotally mounted on said carriage, means for supporting a second gear shaped member on said platform in mesh with said first member, means for rotating said members, and means for automatically pivoting said platform in timed relation to said translation, said means comprising a pin element, a slotted element, one of said elements mounted on said platform, said other element mounted on the machine and fixed relative to the translation, and in cooperating relation with the first element.

12. A machine for finishing gears, comprising a frame, a spindle on said frame, means for mounting a gear shaped member on said spindle, a movable carriage on said frame, means for translating said carriage in a plane parallel to the axis of said spindle, a platform pivotally mounted on said carriage, means for supporting a second gear shaped member on said platform in mesh with said first member, means for rotating said members, and means for automatically pivoting said platform in timed relation to said translation, said means comprising a pin element, a slotted element, one of said elements mounted on said platform, said other element mounted on the machine and fixed relative to the translation, and in cooperating relation with the first element, said slotted element being adjustable.

13. A machine for finishing gears, comprising a frame, a spindle on said frame, means for mounting a gear shaped member on said spindle, a movable carriage on said frame, means for translating said carriage in a plane parallel to the axis of said spindle, a platform pivotally mounted on said carriage, means for supporting a second gear shaped member on said platform in mesh with said first member, means for rotating said members, and means for automatically pivoting said platform in timed relation to said translation, said means comprising a pin element, a slotted element, one of said elements mounted on said platform, said other element mounted on the machine and fixed relative to the translation, and in cooperating relation with the first element, said slotted element being pivotally adjustable to vary in inclination of the slot relative to the direction of translation.

14. A machine for finishing gears comprising means for supporting a gear member in mesh with a gear-like tool member with their axes crossed, means for rotating said members, means translating one of said members in a plane parallel to the axis of said other member to cause said tool member to contact the teeth of said gear member progressively from end to end, and means responsive to said translation for automatically gradually varying the inclination of the axes in timed relation to said translation, said last named means arranged so that the inclination of said axes varies in a reversely repeated cycle as the contact on the teeth of said gear member progresses from mid position on said gear teeth to either end of said gear teeth and return.

15. A machine for finishing gears comprising means for supporting a gear member in mesh with a gear-like tool member with their axes crossed, means for rotating said members, means translating one of said members in a plane parallel to the axis of said other member to cause said tool member to contact the teeth of said gear member progressively from end to end, and means responsive to said translation for automatically gradually imposing on said crossed axis setting an additional inclination of the axes in timed relation to said translation, said additional inclination varying from zero when said members are in contact centrally from end to end of the teeth of said gear member to a maximum when said members are in contact adjacent either end of said teeth.

16. A machine for finishing gears comprising means for supporting a gear member in mesh with a gear-like tool member with their axes crossed, means for rotating said members, means translating one of said members in a plane parallel to the axis of said other member to cause said tool member to contact the teeth of said gear member progressively from end to end, and means responsive to said translation for automatically gradually imposing on said crossed axis setting an additional inclination of the axes in timed relaton to said translation, said additional inclination varying from zero when said members are in contact centrally from end to end of the teeth of said gear member to a maximum when said members are in contact adjacent either end of said teeth, said additional inclination varying with substantial uniformity during said translation.

17. A machine for finishing gears comprising means for supporting a gear member in mesh with a gear-like tool member with their axes crossed, means for rotating said members, means translating one of said members in a plane parallel to the axis of said other member to cause said tool member to contact the teeth of said gear member progressively from end to end, and means responsive to said translation for automatically gradually imposing on said crossed axis setting an additional inclination of the axes in timed relation to said translation, said additional inclination varying from zero when said members are in contact centrally from end to end of the teeth of said gear member to a maximum when said members are in contact adjacent either end of said teeth, said additional inclination varying in a repeated cycle as said contact progresses from mid position on said gear teeth to either end and return.

18. A machine for finishing gears comprising means for supporting two gear shaped members in mesh with their axes crossed at an angle of less than 30°, means for rotating said members, means for translating one of said members in a plane which is parallel to the axis of said other member, and means responsive to said translation for automatically gradually varying the inclination of the axes in timed relationship to said translation, said last named means being adjustable to control the rate and amount of variation of inclination during translation.

19. A machine for finishing gears comprising means for supporting two gear shaped members in mesh with their axes crossed at an angle of less than 30°, means for rotating said members, means for translating one of said members in a plane which is parallel to the axis of said other member, and means responsive to said translation for automatically gradually varying the inclination of the axes in timed relationship to said translation by rocking one of said members about an axis substantially perpendicular to the axis of said gear member.

ROBERT S. DRUMMOND.